US010556469B2

(12) United States Patent
Foor et al.

(10) Patent No.: US 10,556,469 B2
(45) Date of Patent: Feb. 11, 2020

(54) HUB CAP ASSEMBLY AND A WHEEL END ASSEMBLY FOR A TIRE INFLATION SYSTEM

(71) Applicant: Dana Heavy Vehicle Systems Group, LLC, Maumee, OH (US)

(72) Inventors: William J. Foor, Clayton, MI (US); Christopher P. Lewark, Grand Rapids, OH (US); Douglas C. Burke, Deerfield, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 408 days.

(21) Appl. No.: 15/264,427

(22) Filed: Sep. 13, 2016

(65) Prior Publication Data

US 2017/0080760 A1     Mar. 23, 2017

Related U.S. Application Data (60) Provisional application No. 62/219,750, filed on Sep. 17, 2015.

(51) Int. Cl.
| | |
|---|---|
| *B60C 23/00* | (2006.01) |
| *B60B 27/00* | (2006.01) |
| *B60B 27/02* | (2006.01) |

(52) U.S. Cl.
CPC ........ *B60C 23/003* (2013.01); *B60B 27/0047* (2013.01); *B60B 27/0073* (2013.01); *B60B 27/02* (2013.01)

(58) Field of Classification Search
CPC ...... B60C 23/00; B60C 23/001; B60C 23/003
See application file for complete search history.

(56) References Cited

U.S. PATENT DOCUMENTS

| | | | |
|---|---|---|---|
| 1,112,596 | A | 10/1914 | Burggraf, Jr. |
| 1,772,212 | A | 8/1930 | Daneel |
| (Continued) | | | |

FOREIGN PATENT DOCUMENTS

| | | |
|---|---|---|
| EP | 0071278 | 2/1983 |
| EP | 1691090 | 8/2006 |
| (Continued) | | |

OTHER PUBLICATIONS

International Search Report and Written Opinion for Application No. PCT/US2014/023176, dated Sep. 18, 2014, issued by the European Patent Office.

(Continued)

*Primary Examiner* — Jason R Bellinger
(74) *Attorney, Agent, or Firm* — Marshall & Melhorn, LLC (57) ABSTRACT

A wheel end assembly includes a spindle having a passage formed therein. The wheel end assembly also includes a hub cap assembly. The hub cap assembly has an inner housing and an outer housing. The inner housing and outer housing are in fluid communication via an air passage. An air spindle has an inboard portion and an outboard portion. The inboard portion is disposed in the spindle and the outboard portion is disposed in the inner housing. Also, the air spindle has a fluid passage. The fluid passage is in fluid communication with the passage formed in the spindle and the air passage formed in the hub cap assembly. A rotary air seal is disposed around the air spindle. A rotary oil seal is disposed around the air spindle and is spaced apart from the rotary air seal.

19 Claims, 5 Drawing Sheets

(56) References Cited

U.S. PATENT DOCUMENTS

| | | | |
|---|---|---|---|
| 2,156,841 A | 5/1939 | Davis |
| 2,236,235 A | 3/1941 | Head |
| 2,242,207 A | 5/1941 | Bowers |
| 2,715,430 A | 8/1955 | Lindeman |
| 3,114,579 A | 12/1963 | Isenbarger |
| 3,259,404 A | 7/1966 | Papenguth |
| 3,276,503 A | 10/1966 | Klimarx |
| 3,829,104 A | 8/1974 | Green |
| 3,855,383 A | 12/1974 | Dahlgren |
| 3,858,950 A | 1/1975 | Otto |
| 3,879,001 A | 4/1975 | Schovee |
| 4,026,183 A | 5/1977 | Bart |
| 4,073,540 A | 2/1978 | Jackowski |
| 4,154,279 A | 5/1979 | Tsuruta |
| 4,191,389 A | 3/1980 | Jelinek |
| 4,251,082 A | 2/1981 | Little |
| 4,282,949 A | 8/1981 | Kopich et al. |
| 4,434,833 A | 3/1984 | Swanson et al. |
| 4,448,461 A | 5/1984 | Otto |
| 4,470,506 A | 9/1984 | Goodell et al. |
| 4,492,019 A | 1/1985 | Wells et al. |
| 4,582,107 A | 4/1986 | Scully |
| 4,641,698 A | 2/1987 | Bitonti |
| 4,705,090 A | 11/1987 | Bartos |
| 4,733,707 A | 3/1988 | Goodell |
| 4,834,464 A | 5/1989 | Frehse |
| 4,844,138 A | 7/1989 | Kokubu |
| 4,883,106 A | 11/1989 | Schultz et al. |
| 4,892,128 A | 1/1990 | Bartos |
| 4,895,199 A | 1/1990 | Magnuson et al. |
| 4,921,258 A | 5/1990 | Fournier et al. |
| 4,932,451 A | 6/1990 | Williams et al. |
| 5,080,156 A | 1/1992 | Bartos |
| 5,174,839 A | 12/1992 | Schultz et al. |
| 5,203,391 A | 4/1993 | Fox |
| 5,217,137 A | 6/1993 | Andrews |
| 5,221,381 A | 6/1993 | Hurrell, II |
| 5,236,028 A | 8/1993 | Goodell et al. |
| 5,240,039 A | 8/1993 | Colussi et al. |
| 5,287,906 A | 2/1994 | Stech |
| 5,328,275 A | 7/1994 | Winn et al. |
| 5,377,736 A | 1/1995 | Stech |
| 5,398,743 A | 3/1995 | Bartos |
| 5,429,167 A | 7/1995 | Jensen |
| 5,482,358 A | 1/1996 | Kuck |
| 5,505,080 A | 4/1996 | McGhee |
| 5,505,525 A | 4/1996 | Denton |
| 5,524,904 A | 6/1996 | Willi et al. |
| 5,538,330 A | 7/1996 | Ehrlich |
| 5,584,949 A | 12/1996 | Ingram |
| 5,658,053 A | 8/1997 | Vencill et al. |
| 5,752,746 A | 5/1998 | Perry |
| 5,769,979 A | 6/1998 | Naedler |
| 5,785,390 A | 7/1998 | Gold et al. |
| 5,860,708 A | 1/1999 | Borders et al. |
| 5,868,881 A | 2/1999 | Bradley |
| 5,904,427 A | 5/1999 | Braun et al. |
| 5,979,526 A | 11/1999 | Chamoy |
| 5,997,005 A | 12/1999 | Gold et al. |
| 6,105,645 A | 8/2000 | Ingram |
| 6,145,558 A | 11/2000 | Schmitz |
| 6,145,559 A | 11/2000 | Ingram, II |
| 6,158,743 A | 12/2000 | Anderson et al. |
| 6,199,611 B1 | 3/2001 | Wernick |
| 6,244,316 B1 | 6/2001 | Naedler |
| 6,260,595 B1 | 7/2001 | Cobb |
| 6,269,691 B1 | 8/2001 | Sowatzke et al. |
| 6,273,519 B1 | 8/2001 | Tsou |
| 6,283,186 B1 | 9/2001 | Krisher |
| 6,290,235 B1 | 9/2001 | Albertson |
| 6,325,124 B1 | 12/2001 | Colussi et al. |
| 6,334,791 B1 | 1/2002 | Yeh |
| 6,394,159 B1 | 5/2002 | Cobb |
| 6,425,427 B1 | 7/2002 | Stech |
| 6,435,238 B1 | 8/2002 | Hennig |
| 6,439,044 B1 | 8/2002 | Tigges |
| 6,447,072 B1 | 9/2002 | Johnson |
| 6,484,774 B1 | 11/2002 | Naedler |
| 6,488,342 B1 | 12/2002 | De Paiva |
| 6,575,028 B2 | 6/2003 | Colussi et al. |
| 6,575,269 B1 | 6/2003 | Skoff |
| 6,698,482 B2 | 3/2004 | Hennig et al. |
| 6,719,028 B2 | 4/2004 | D'Amico et al. |
| 6,783,191 B1 | 8/2004 | Slesinski et al. |
| 6,871,683 B2 | 3/2005 | Cobb |
| 7,117,909 B2 | 10/2006 | Jarrett et al. |
| 7,185,688 B2 | 3/2007 | Hayes et al. |
| 7,207,365 B2 | 4/2007 | Nelson et al. |
| 7,302,979 B2 | 12/2007 | Davison et al. |
| 7,306,020 B2 | 12/2007 | Beverly et al. |
| 7,488,046 B2 | 2/2009 | Vignotto et al. |
| 7,686,313 B2 | 3/2010 | Fogler et al. |
| 7,690,412 B1 | 4/2010 | Jenkinson et al. |
| 7,762,372 B2 | 7/2010 | LeBlanc, Sr. et al. |
| 7,896,045 B2 | 3/2011 | Solie et al. |
| 7,931,061 B2 | 4/2011 | Gonska et al. |
| 7,963,159 B2 | 6/2011 | Ingram et al. |
| 7,967,045 B2 | 6/2011 | Jenkinson et al. |
| 7,975,739 B1 | 7/2011 | Ingram |
| 7,992,610 B2 | 8/2011 | Collet |
| 7,997,316 B2 | 8/2011 | Walter et al. |
| 8,002,237 B2 | 8/2011 | Hubacek et al. |
| 8,028,732 B1 | 10/2011 | Ingram et al. |
| 8,051,940 B2 | 11/2011 | Ziech |
| 8,052,400 B2 | 11/2011 | Isono |
| 8,069,890 B2 | 12/2011 | Resare et al. |
| 8,122,926 B2 | 2/2012 | Rogers |
| 8,191,594 B2 * | 6/2012 | Saadat ................ B60C 23/003 |
| | | 152/417 |
| 8,307,869 B2 | 11/2012 | Medley |
| 8,397,774 B2 | 3/2013 | Gnoska et al. |
| 8,453,692 B2 | 6/2013 | Saadat |
| 8,479,790 B2 | 7/2013 | Resare |
| 8,505,600 B2 | 8/2013 | Padula et al. |
| 8,590,585 B2 | 11/2013 | Rogers |
| 8,616,254 B2 | 12/2013 | Kelley |
| 8,746,305 B2 | 6/2014 | Lloyd |
| 8,783,314 B2 | 7/2014 | Tigges |
| 8,915,274 B2 | 12/2014 | Eschenburg et al. |
| 8,981,919 B2 | 3/2015 | Massey et al. |
| 8,997,336 B2 | 4/2015 | Strizki et al. |
| 9,126,460 B2 | 9/2015 | Knapke |
| 9,132,704 B2 | 9/2015 | Wilson et al. |
| 9,162,539 B2 | 10/2015 | Hibbler |
| 9,221,308 B2 | 12/2015 | Nelson et al. |
| D749,482 S | 2/2016 | Schroeder et al. |
| 9,290,044 B2 | 3/2016 | Leung |
| 9,315,077 B2 | 4/2016 | Flory |
| 9,446,637 B2 | 9/2016 | Knapke |
| 2003/0080862 A1 | 5/2003 | Kranz |
| 2005/0133134 A1 | 6/2005 | Ingram et al. |
| 2005/0257872 A1 | 11/2005 | Szykulski |
| 2008/0185086 A1 | 8/2008 | Ingram et al. |
| 2009/0283190 A1 | 11/2009 | Padula et al. |
| 2012/0024445 A1 * | 2/2012 | Wilson ................ B60C 23/003 |
| | | 152/415 |
| 2012/0318422 A1 | 12/2012 | Lloyd |
| 2013/0087262 A1 | 4/2013 | Hennig |
| 2013/0199685 A1 | 8/2013 | Nelson et al. |
| 2014/0076456 A1 | 3/2014 | Kranz |
| 2014/0261941 A1 * | 9/2014 | Knapke ................ B60C 23/003 |
| | | 152/417 |
| 2015/0180188 A1 | 6/2015 | Strizki et al. |
| 2016/0016443 A1 * | 1/2016 | Morgan ................ B60C 23/003 |
| | | 152/417 |
| 2016/0361957 A1 * | 12/2016 | Burke ................ B60C 23/003 |

FOREIGN PATENT DOCUMENTS

| | | |
|---|---|---|
| EP | 1944518 | 7/2008 |
| GB | 2178705 | 2/1987 |
| GB | 2223207 | 4/1990 |
| GB | 2477816 | 8/2011 |

(56) References Cited

FOREIGN PATENT DOCUMENTS

| WO | 03037662 A1 | 5/2003 | |
|---|---|---|---|
| WO | 2004080729 A2 | 9/2004 | |
| WO | 2013119498 A2 | 8/2013 | |
| WO | 2013119634 A1 | 8/2013 | |
| WO | 2014047240 A2 | 3/2014 | |
| WO | 2015061523 | 4/2015 | |
| WO | WO-2017106181 A1 * | 6/2017 | ........... B60C 23/003 |

OTHER PUBLICATIONS

International Search Report and Written Opinion for International Patent Application No. PCT/US2013/035588, dated Sep. 6, 2013, issued by the European Patent Office. 13 pages.

International Search Report and Written Opinion for International Patent Application No. PCT/US2016/057880, dated Jan. 19, 2017, issued by the European Patent Office. 10 pages.

* cited by examiner

HUB CAP ASSEMBLY AND A WHEEL END ASSEMBLY FOR A TIRE INFLATION SYSTEM

CROSS-REFERENCE TO RELATED APPLICATION

This application is claiming the benefit, under 35 U.S. C. 119(a), of the U.S. patent application which was granted Ser. No. 62/219,750 and filed on Sep. 17, 2015, the entire disclosure of which is hereby incorporated by reference.

BACKGROUND OF THE INVENTION

The invention relates to a hub cap assembly and, more particularly, to a wheel end assembly for a tire inflation system made with the hub cap assembly.

Tire inflation systems for vehicles provide a vehicle the versatility of adjusting tire pressures while the vehicle is stationary or in motion. For example, utilizing a tire inflation system, the tire pressure of one or more wheel assemblies may be decreased to increase tire traction, or increased to reduce rolling resistance and increase the vehicle's fuel efficiency and tire life-span. Tire inflation systems known in the art often employ wheel end assemblies which permit fluid communication between the rotating portions and non-rotating portions of the vehicle. The wheel end assemblies known in the art are often complex and expensive to manufacture.

Therefore, it would be desirable to provide a hub cap assembly and wheel end assembly which overcome the disadvantages of the prior art.

BRIEF SUMMARY OF THE INVENTION

Embodiments of a wheel end assembly for a tire inflation system are provided.

In an embodiment, the wheel end assembly comprises a spindle having a passage formed therein. The wheel end assembly also comprises a hub cap assembly. The hub cap assembly has an inner housing and an outer housing. The inner housing and outer housing are in fluid communication via an air passage. An air spindle has an inboard portion and an outboard portion. The inboard portion is disposed in the spindle and the outboard portion is disposed in the inner housing. Also, the air spindle has a fluid passage. The fluid passage is in fluid communication with the passage formed in the spindle and the air passage formed in the hub cap assembly. A rotary air seal is disposed around the air spindle. A rotary oil seal is disposed around the air spindle and is spaced apart from the rotary air seal.

In another embodiment, the wheel end assembly comprises a spindle having a passage formed therein. The wheel end assembly also comprises a hub cap assembly. The hub cap assembly has an inner housing and an outer housing. The inner housing and outer housing are in fluid communication via an air passage. An air spindle has an inboard portion and an outboard portion. The inboard portion is disposed in the spindle and the outboard portion is disposed in the inner housing. Also, the air spindle has a fluid passage. The fluid passage is in fluid communication with the passage formed in the spindle and the air passage formed in the hub cap assembly. A rotary air seal is disposed around the air spindle. A rotary oil seal is disposed around the air spindle and is spaced apart from the rotary air seal. A vent chamber is provided between the rotary air seal and the rotary oil seal. The vent chamber is in fluid communication with the atmosphere via a vent passage.

BRIEF DESCRIPTION OF THE SEVERAL VIEWS OF THE DRAWING

The above, as well as other advantages of the process will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Embodiments of a hub cap assembly 10 are described herein. The hub cap assembly 10 may be utilized as portion of a steer axle. However, it should be appreciated that the hub cap assembly 10 may be utilized with other types of axles. For example, in an embodiment, the hub cap assembly may be utilized with a lift axle. It should also be appreciated that the hub cap assembly may be utilized with a steerable axle or a non-steerable axle. In still other embodiments (not depicted), the hub cap assembly may be utilized with a drive axles or non-drive axles.

Figure 1:
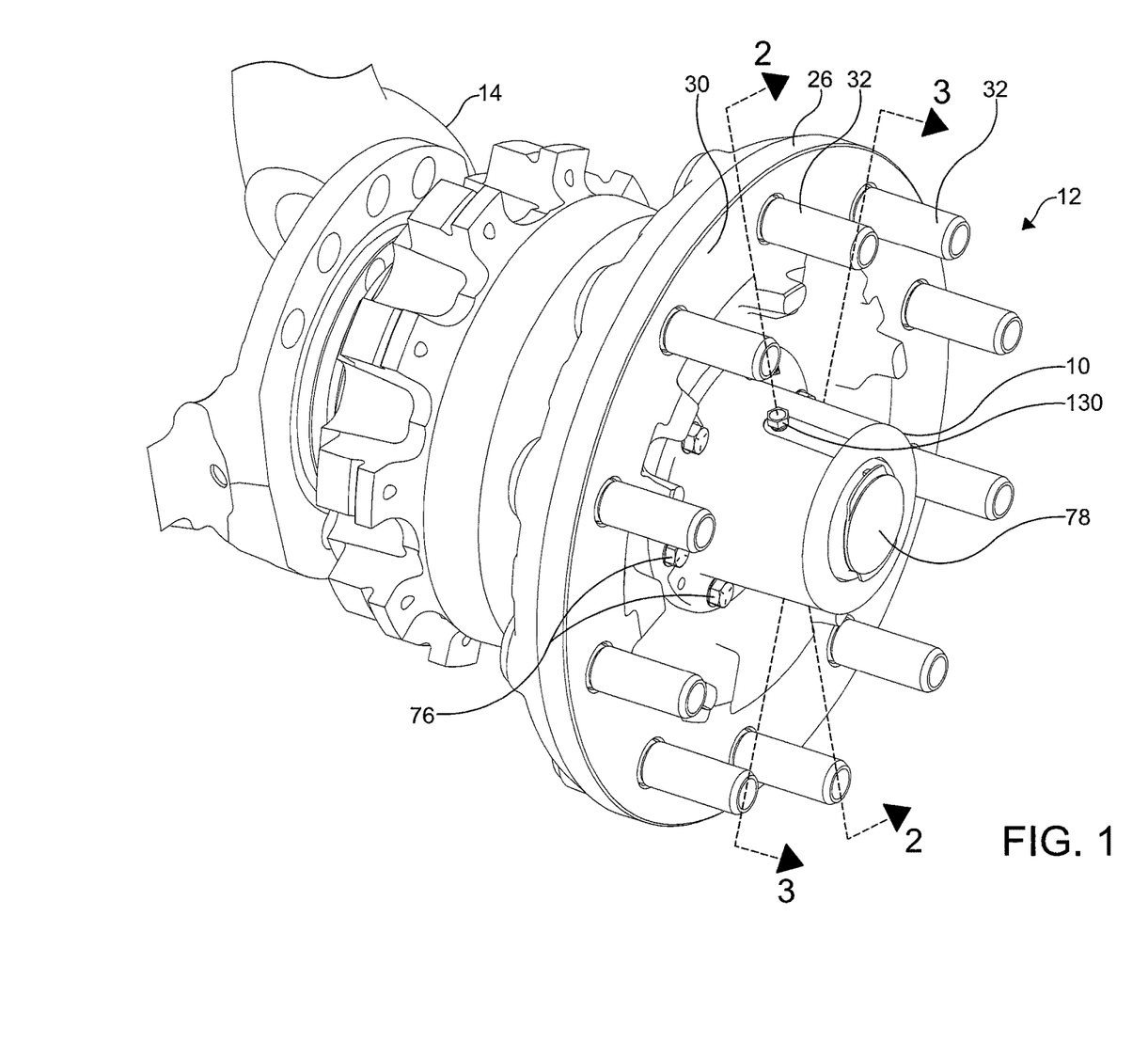
FIG. 1 is a perspective view of a steer axle wheel end assembly illustrating certain embodiments of the invention.

Referring now to FIG. 1, the hub cap assembly 10 is utilized in a wheel end assembly 12. Preferably, the wheel end assembly is utilized as a steer axle wheel end assembly. In this embodiment, the wheel end assembly 12 comprises a steer axle (not depicted) having an outboard end. The outboard end of the steer axle has a king pin bore (not depicted) extending therethrough.

A knuckle 14 is disposed adjacent the outboard end of the steer axle. The knuckle comprises an upper portion and a lower portion. The upper portion of the knuckle defines an upper king pin boss (not depicted) and the lower portion of the knuckle defines a lower king pin boss (not depicted). The bosses are generally vertically aligned with one another. An upper bore extends through the upper king pin boss and a lower bore extends through the lower king pin boss. The king pin boss bores are aligned with the steer axle king pin bore.

The upper and lower king pin boss bores and the king pin bore receive a king pin (not depicted) therethrough. Bushings (not depicted) may be located within the bores to pivotally support the king pin therein. The king pin pivotally connects the knuckle with the steer axle.

Figure 2:
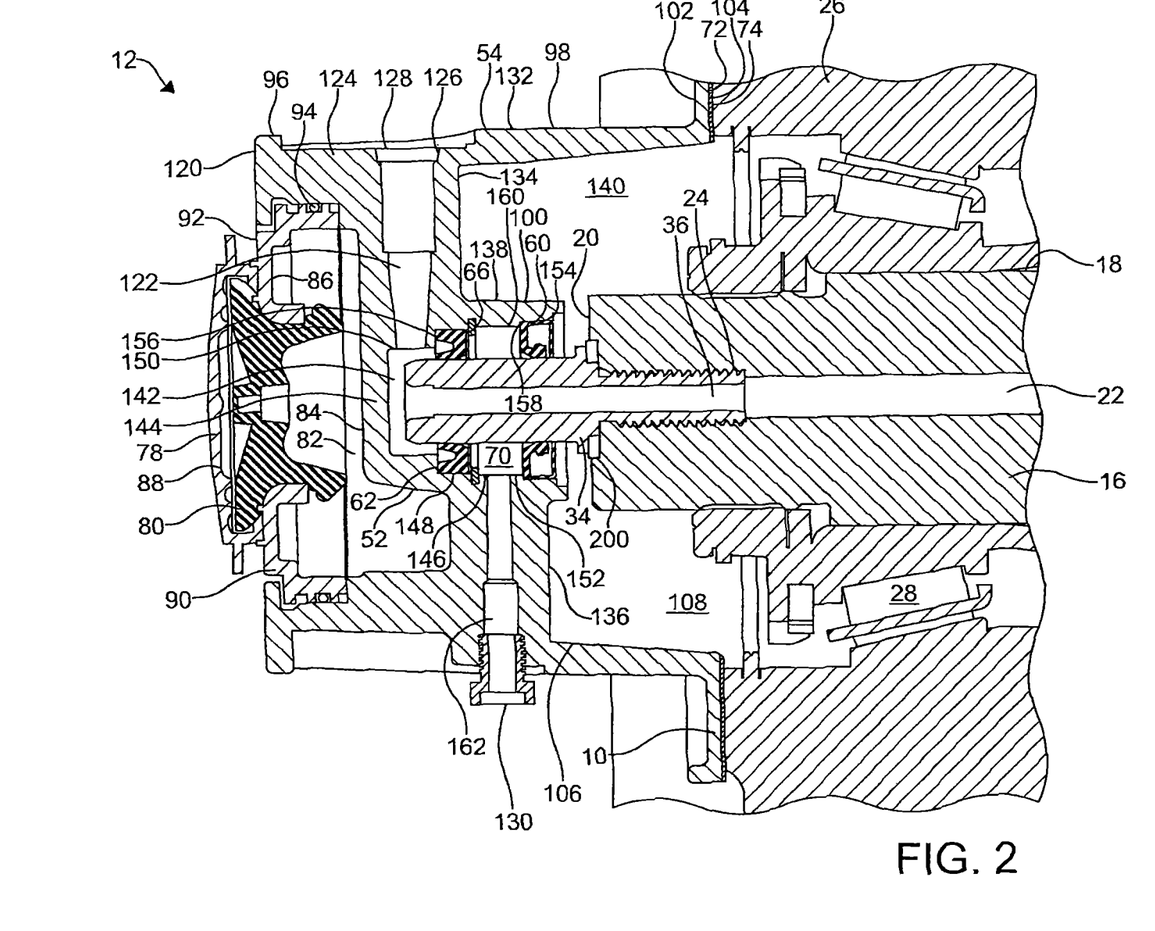
FIG. 2 is a sectional view through a portion of the wheel end assembly of FIG. 1.
Figure 3:
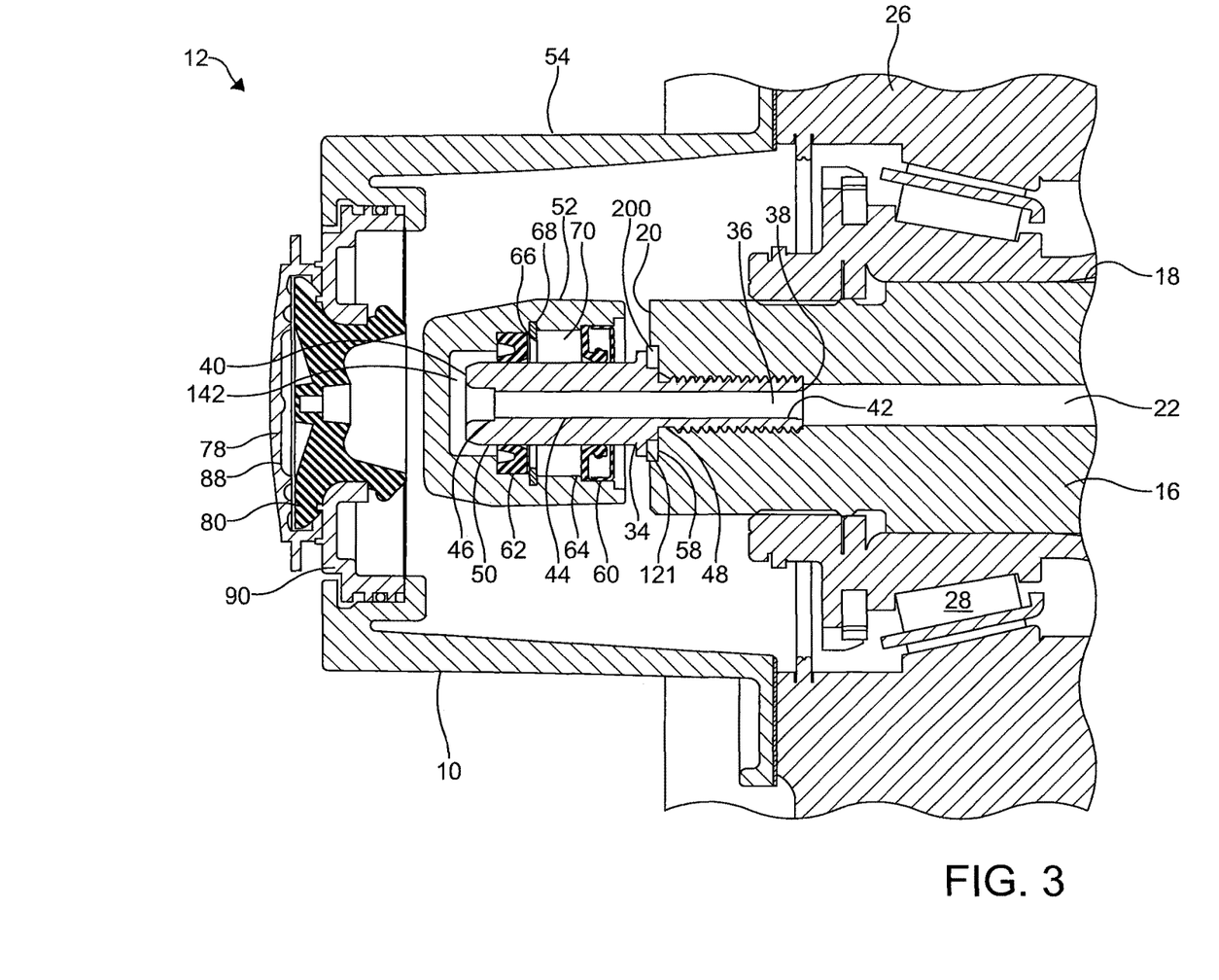
FIG. 3 is a sectional view through another portion of the wheel end assembly of FIG. 1.

Referring now to FIGS. 2-3, the wheel end assembly 12 comprises a spindle 16. The spindle 16 is coupled to the knuckle 14. The spindle 16 extends from the knuckle 14 in an outboard direction. As illustrated, the spindle 16 has an outer diameter 18 that tapers from an inboard end (not depicted) to an outboard end 20. The spindle 16 is a non-rotating member of the wheel end assembly 12. One or more steer arms (not depicted) or other suspension component connection portions may also be attached or connected to the knuckle 14.

A knuckle air passage (not depicted) extends through the knuckle 14, where it may begin adjacent to the upper king pin boss. The knuckle air passage is utilized to communicate pressurized air. The knuckle air passage may extend toward the spindle 16 at a downward angle. The knuckle air passage intersects and is in fluid communication with a spindle air passage 22. In an embodiment, the knuckle air passage intersects the spindle air passage 22 adjacent a first end (not depicted) thereof. In certain embodiments, the knuckle air passage may be provided in a substantially perpendicular relationship with the spindle air passage 22. It should be appreciated that the knuckle air passage and the spindle air passage may also comprise one or more passages at different angles or locations and intersect at different angles and locations in the wheel end assembly.

The spindle air passage 22 is utilized to communicate pressurized air. The spindle air passage 22 is formed in the spindle 16 and extends from the inboard end of the spindle toward the outboard end 20 of the spindle 16. Preferably, the spindle air passage 22 is aligned with a longitudinal axis of the spindle 16. The spindle air passage 22 may be of a diameter which is substantially constant. Preferably, the spindle air passage 22 comprises a threaded portion 24 disposed adjacent the outboard end 20 of the spindle 16.

Referring now to FIGS. 1-3, the wheel end assembly 12 may comprise a hub 26. The hub 26 is rotatably mounted on and concentric with the spindle 16. A bearing 28 is located between the hub 26 and the spindle 16 to permit the hub 26 to rotate with respect to the spindle 16. At an outboard end, the hub 26 comprises a fastener flange 30. Fasteners 32 are located through the fastener flange 30 for connecting the hub 26 to a wheel assembly (not depicted). The hub 26 may also have a braking surface (not depicted) attached thereto. The braking surface may be provided as a portion of a brake rotor (not depicted) or a brake drum (not depicted). The brake rotor may be attached to the hub 26 and located on the hub 26 inboard of the fasteners 32.

An air spindle 34 is coupled to the spindle 16 at the outboard end 20 of the spindle 16. The air spindle 34 is a non-rotating member of the wheel end assembly 12. An inboard portion of the air spindle 34 is disposed in the spindle 16. More particularly, the inboard portion of the air spindle 34 is disposed in the outboard end of the spindle air passage 22. The air spindle 34 has a fluid passage 36 in fluid communication with the spindle air passage 22. Also, the fluid passage 36 is longitudinally aligned with the spindle air passage 22. The fluid passage 36 extends from an inboard end 38 to an outboard end 40 of the air spindle 34. In one embodiment, the fluid passage 36 is of a substantially constant diameter in an inboard end portion 42 thereof. A portion of the outboard end portion 44 of the fluid passage 36 may be of a diameter which is similar or equal to the diameter in the inboard end portion 42. In an embodiment, a portion 46 of the outboard end portion 44 of the fluid passage 36 is sharply defined. In this embodiment, the portion 46 may be defined by a generally hexagonal shaped cavity 119, which is illustrated best in FIG. 4, formed in the outboard end 40 of the air spindle 34.

Figure 4:
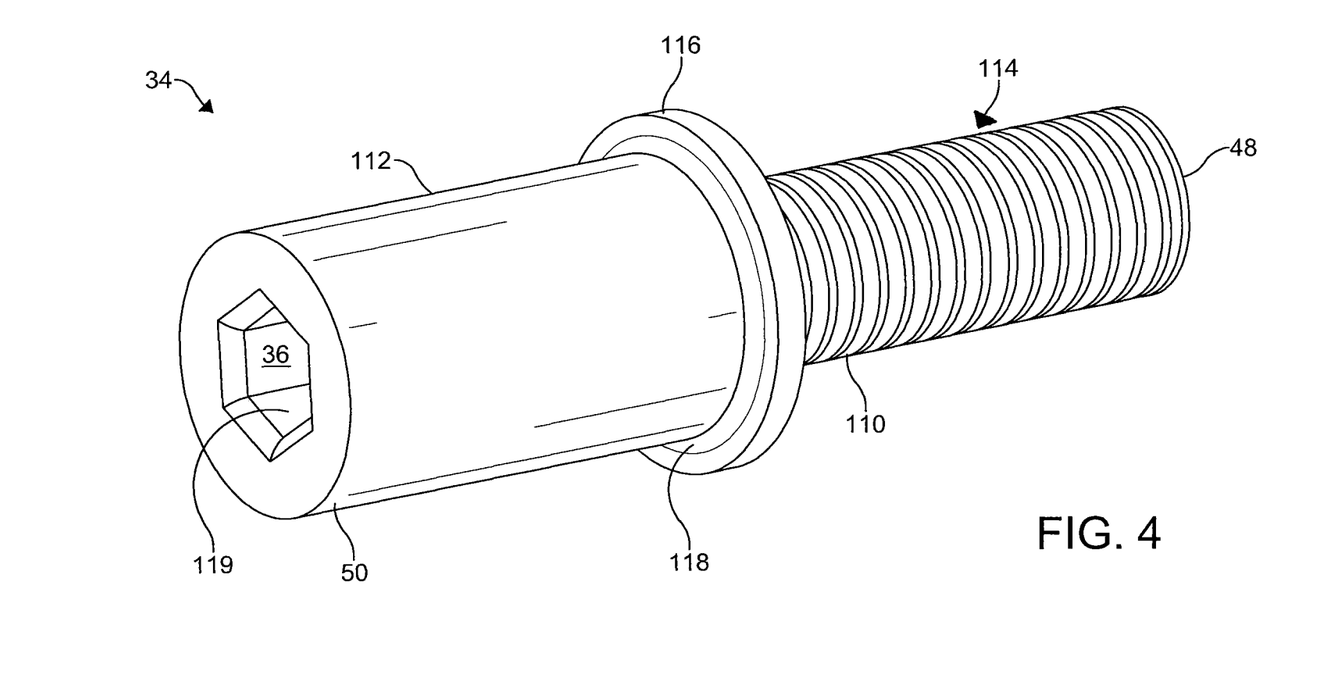
FIG. 4 is a perspective view of an embodiment of an air spindle for use in the wheel end assembly of FIG. 1.

Referring to FIG. 4, the inboard portion 48 of the air spindle 34 comprises a first outer diameter portion 110 and an outboard portion 50 of the air spindle 34 comprises a second outer diameter portion 112. As is illustrated in FIGS. 2-3, in the wheel end assembly 12, the outboard portion 50 of the air spindle 34 is disposed in an inner housing 52 of the hub cap assembly 10. The hub cap assembly 10 also comprises an outer housing 54. Preferably, the second outer diameter portion 112 is of a diameter which is greater than that of the first outer diameter portion 110. A threaded portion 114 is provided on the first outer diameter portion 110 for coupling to the air spindle 34 to the spindle air passage threaded portion 24. An annular protuberance 116 is attached to the second outer diameter portion 112 of the air spindle 34. The annular protuberance 116 is of a diameter which is greater than that of the second outer diameter portion 112. The annular protuberance 116 may be attached to the second outer diameter portion 112 by a filleted portion 118 and is provided to secure the axial position a washer 56, 200.

Referring to FIGS. 2-3, a locking washer 200 may be disposed around the inboard portion of the air spindle 34. In this position, the locking washer 200 abuts an inboard facing surface 121 of the annular protuberance 116. The locking washer 200 may also be positioned in an annular groove 58 formed in the outboard end 20 of the spindle 16 at the outboard end of the spindle air passage 22. The locking washer 200 is positioned between the spindle 16 and the air spindle 34 to provide a seal at an interface of the spindle air passage 22 and the air spindle 34. More particularly, the locking washer 200 seals the interface between the spindle air passage 22 and the air spindle 34 at the outboard end of the spindle air passage 22 and the first outer diameter portion 110 of the air spindle 34 so that pressurized air directed through the spindle air passage 22 is transferred to the fluid passage 36 of the air spindle 34 and vice versa.

Figure 5:
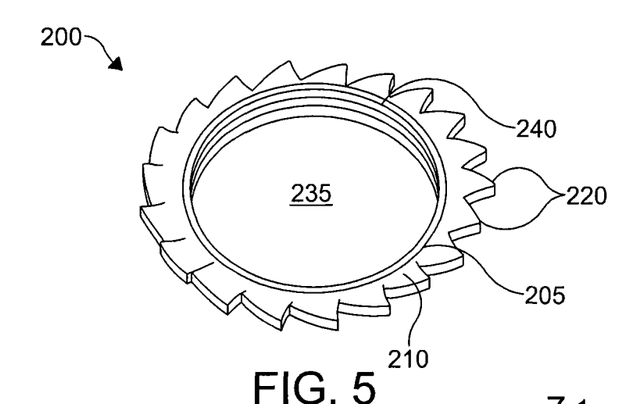
FIG. 5 is a perspective view of an embodiment of a locking washer for use in the wheel end assembly of FIG. 1.
Figure 6:
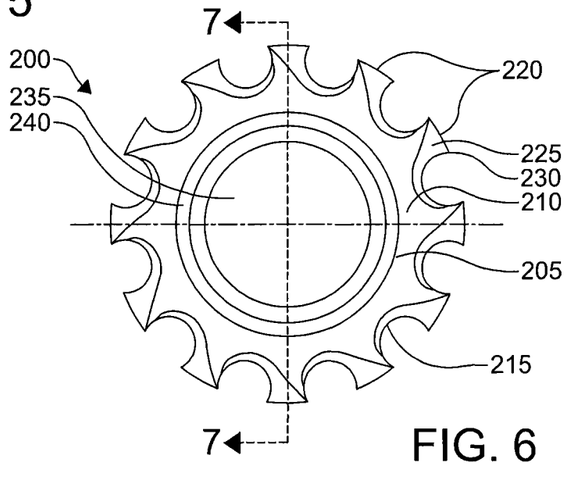
FIG. 6 is a plan view of the locking washer of FIG. 5.
Figure 7:
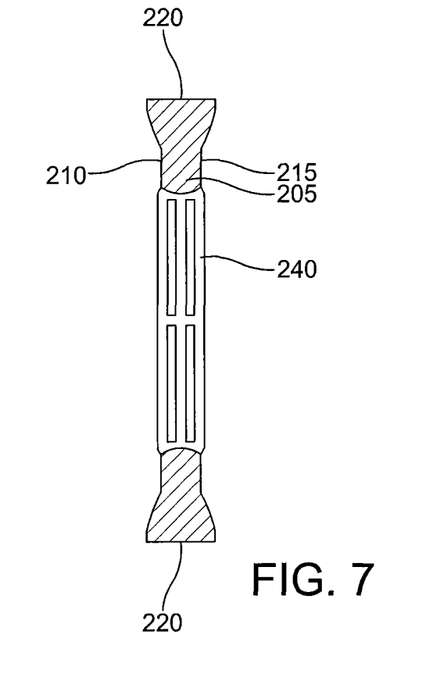
FIG. 7 is a sectional view through the locking washer of FIG. 6 along line 7-7.

The locking washer 200 may be formed from a suitable metal such as aluminum or steel. Referring now to FIGS. 5-7, the locking washer 200 is a generally annular member. In these embodiments, the locking washer 200 comprises an inner ring 205. The inner ring 205 comprises a first surface 210 and a second surface 215. In other embodiments, the locking washer 200 may be of a hollow star shape.

A plurality of teeth 220 are attached to the inner ring 205 and are circumferentially spaced apart around the inner ring 205. The teeth 220 comprise edges 225, 230 which allow the locking washer 200 to engage oppositely facing surfaces provided on the spindle 16 and the air spindle 34, respectively. The teeth 220 engage an inboard facing surface of the air spindle 34 and an outboard facing surface of the annular groove 58 to prevent vibration(s) or other forces from separating the spindle 16 and the air spindle 34.

The locking washer 200 has an opening 235 formed therein which extends from the first surface 210 to the second surface 215 so that the locking washer 200 can be disposed around the inboard portion of the air spindle 34. The opening 235 is defined by a sealing portion 240.

The sealing portion 240 comprises an elastomeric material. In certain embodiments, the elastomeric material is resistant to lubricant and moisture. In an embodiment, the elastomeric material is bonded to the inner ring 205 via molding or another suitable process. The elastomeric material may be bonded to the inner ring 205 in such a manner that an annular portion of the first surface 210 and the second surface 215 is covered by the elastomeric material. The elastomeric material is utilized to provide a seal at the interface between the spindle 16 and the air spindle 34. In an embodiment, the elastomeric material on the first surface 210 seals against a portion of the inboard facing surface of the air spindle 34 and the elastomeric material on the second surface 215 seals against a portion of the outboard facing surface of the annular groove 58 to prevent pressurized air from leaking between the spindle air passage 22 and the air spindle 34.

In other embodiments, a non-locking sealing washer 56 (not depicted) may be utilized in place of the locking washer 200. The sealing washer 56 is located in a similar position to and performs in a similar manner as the locking washer 200 described above.

In other embodiments (not depicted), the wheel end assembly 12 does not include a washer. In these embodiments, a sealing material (not depicted) such as, for example, Loctite® Dri-Loc® Threadlocker, a product of the Henkel Corporation who's United States headquarters is located at One Henkel Way, Rocky Hill, Conn. 06067, may be utilized to seal the interface between the spindle air passage and the air spindle so that pressurized air directed through the spindle air passage is transferred to the fluid passage of the air spindle and vice versa. In these embodiments, the sealing material is located on the threaded portion of the air spindle. In other embodiments (not depicted), the wheel end assembly comprises a washer (locking or non-locking) and the sealing material. In further embodiments (not depicted), the wheel end assembly comprises a washer, sealing material and a thread sealant. In an embodiment, the thread sealant may be a tape. In still further embodiments (not depicted), the wheel end assembly comprises the locking washer and the thread sealant. In an additional embodiment (not depicted), the wheel end assembly comprises a non-locking washer and thread sealant. In yet another embodiment (not depicted), the wheel end assembly comprises a sealing material and thread sealant.

In an embodiment (not depicted), the wheel end assembly may comprise an annular locating washer disposed around the second outer diameter portion of the air spindle. If provided, the locating washer is utilized to secure the axial location of a rotary oil seal 60. The rotary oil seal 60 is attached to an inner surface 146 of the inner housing 52 via staking or another process. In this position, the rotary oil seal 60 is disposed around the air spindle 34. More particularly, the rotary oil seal 60 is disposed around the outboard portion 50 of the air spindle 34. Preferably, the rotary oil seal 60 is disposed around the second outer diameter portion 112 of the air spindle 34. A snap ring (not depicted) or another positioning member may also be disposed around the second outer diameter portion of the air spindle or in a groove (not depicted) formed in the inner surface of the inner housing to prevent the axial location of the rotary oil seal 60 from changing.

The wheel end assembly 12 further comprises a rotary air seal 62. The rotary oil seal 60 and the rotary air seal 62 are each disposed in the inner housing 52 of the hub cap assembly 10. Within the inner housing, the rotary air seal 62 is spaced apart from the rotary oil seal 60. Also, the rotary air seal 62 is provided outboard of the rotary oil seal 60. The air spindle 34 extends in an outboard direction from the spindle 16 and beyond the rotary oil seal 60 and the rotary air seal 62.

The rotary air seal 62 is disposed around the air spindle 34. More particularly, the rotary air seal 62 is disposed around the outboard portion 50 of the air spindle 34. Preferably, the rotary air seal 62 is disposed around the second outer diameter portion 112 of the air spindle 34. Preferably, the rotary oil seal 60 and the rotary air seal 62 are attached to an inner surface 64 of the hub cap assembly 10 and are in sealing contact with the second outer diameter portion 112 of the air spindle 34. In an embodiment, a snap ring 66 is disposed around the second outer diameter portion 112 of the air spindle 34 to prevent the axial location of the rotary air seal 62 from changing. The snap ring 66 is secured in a groove 68 formed in the inner surface 64 of the hub cap assembly 10. The rotary oil seal 60 and the rotary air seal 62 help prevent, or reduce, oil leakage and air leakage, respectively, into a vent chamber 70. The rotary oil seal 60 also prevents pressurized air from entering the hub 26.

The hub cap assembly 10 is rotatably disposed about the air spindle 34. The hub cap assembly 10 may be formed using a machining or a die-casting process. The hub cap assembly 10 may be manufactured out of any material(s), having the necessary characteristics to enable its function in the wheel end assembly 12 for a variable length of time, including but not limited to aluminum, aluminum alloy, steel, iron, titanium, carbon fiber, polymer materials or any combination thereof.

As noted above, the rotary oil seal 60 and the rotary air seal 62 are attached to the inner surface 64 of the hub cap assembly 10 and provide separate seals between the inner surface 64 of the hub cap assembly 10 and the outboard portion 50 of the air spindle 34. In an embodiment, an inboard surface 72 of the hub cap assembly 10 faces an outboard surface 74 of the hub 26. The hub cap assembly 10 is attached to the hub 26 for rotation therewith. As illustrated in FIG. 1, the hub cap assembly 10 is attached to the hub 26 by one or more fasteners 76. The fasteners 76. are of a length which is suitable to attach the hub cap assembly 10 to the hub 26.

In an embodiment, the hub cap assembly 10 also comprises a pressure relief mechanism 78. The pressure relief mechanism 78 is utilized to prevent over pressurization of the hub oil seal (not depicted). In an embodiment, the pressure relief mechanism 78 comprises a pressure relief valve 80. The pressure relief valve 80 allows pressurized air in a space 82 between an end surface 84 of the inner housing 52 and an outboard end portion 86 of the outer housing 54 to be discharged to atmosphere. In certain embodiments, the pressure relief valve 80 may be of the rubber plug or diaphragm variety. The pressure relief mechanism 78 may also comprise an end cap 88. The end cap 88 is disposed over and is engaged with the pressure relief valve 80. The end cap 88 is utilized to prevent dirt and debris from blocking an opening in the pressure relief valve 80. The opening is utilized to permit pressurized air from the space 82 to pass through the pressure relief valve 80 to the atmosphere.

Preferably, the pressure relief mechanism 78 forms a portion of the outboard end portion 86 of the outer housing 54. More particularly, the pressure relief valve 80 is disposed in a center portion of a sight glass 90. The sight glass 90 is provided as a portion of the outer housing 54 and partially defines an end surface 92 of the outer housing 54. A seal 94 is disposed between the sight glass 90 and an outer wall portion 96. The seal 94 prevents oil or another lubricant from leaking out of the hub cap assembly 10 between the outer housing 54 and the sight glass 90. The outer wall portion 96 also partially defines the end surface 92 of the outer housing 54. Preferably, the sight glass 90 is made of a transparent material so that it can be utilized to inspect the oil or lubricant level in the wheel end assembly 12. When needed, the pressure relief mechanism 78 may be temporarily removed from the wheel end assembly 10 to add or remove oil from the wheel end assembly 12.

The outer housing 54 is connected to and in fluid communication with the inner housing 52. The outer housing 54 surrounds the inner housing 52. In an embodiment, the outer housing 54 has an outer diameter 98 which is greater than an outer diameter 100 of the inner housing 52. Also, the end surface 84 of the inner housing 52 and the outboard end portion 86 of the outer housing 54 are axially spaced apart.

In an embodiment, the outer housing 54 comprises the outer wall portion 96 and the outboard end portion 86. The outer wall portion and portions of the outboard end portion 86 may be formed in a unitary manner. However, as illustrated, the outer wall portion 96 and portions 78, 90 of the outboard end portion 86 may be also be formed separately and attached together utilizing one or more fasteners (not depicted) or another method during the manufacture of the wheel end assembly 12.

The outer housing 54 also comprises a radially extending flange 102, which is in sealing contact with the outboard surface 74 of the hub 26. A seal member 104 is provided between the flange 102 and the outboard surface 74 to prevent oil or another lubricant from escaping therebetween. The radially extending flange 102 is formed in a unitary manner with the outer wall portion 96 and extends radially therefrom. The outer wall portion 96 comprises an inner surface 106 which at least partially defines a cavity 108 containing oil or another lubricant. The outer wall portion 96 is of a generally cylindrical shape and increases in thickness adjacent an outboard end 120 thereof. Also, as illustrated best in FIGS. 2-3, the outer wall portion 96 includes a decreased thickness portion adjacent an inboard end thereof.

The inner housing 52 and the outer housing 54 are in fluid communication via an air passage 122. A portion of the hub cap assembly air passage 122 is formed in the increased thickness portion 124 of the outer wall portion 96. On an end, the hub cap assembly air passage 122 is in fluid communication with one or more conduits (not depicted). The one or more conduits are utilized to enable fluid communication between the hub cap assembly air passage 122 and a wheel valve (not depicted) or the wheel assembly (not depicted). In these embodiments, the one or more conduits may be attached to the hub cap assembly 10 via a port 126. On an opposite end, the hub cap assembly air passage 122 is in fluid communication with the fluid passage 36 in the air spindle 34.

The port 126 comprises a port opening 128. The port 126 is in fluid communication with the one or more conduits and is capable of coupling thereto via the port opening 128 or in another manner. In an embodiment, the one or more conduits may be one or more tire air hoses.

The hub cap assembly air passage 122 is provided through a first arm 134. The first arm 134 and a second arm 136 are each attached to the inner housing 52 and the outer housing 54. The arms 134, 136, portions 96, 102 of the outer housing 54, and the inner housing 52 may be formed in a unitary manner using a machine or a die-cast process.

The first arm 134 and the second arm 136 each extend in a radial direction between the inner housing 52 and the outer housing 54. The first arm 134 and the second arm 136 are in a parallel relationship with each other. The first arm 134 is circumferentially spaced apart from the second arm 136 about an outer surface 138 of the inner housing 52. The spaces provided between the first arm 134 and the second arm 136 are utilized to allow fluid communication between the outboard space 82 and an inboard space 140 provided within the outer housing 54. As described above, the outboard space 82 is provided between the end surface 84 of the inner housing 52 and the outboard end portion 86 of the outer housing 54.

The hub cap assembly air passage 122 extends from the increased thickness portion 124 of the outer wall portion 96 through the first arm 134 to the inner housing 52. Thus, the first arm 134 at least partially defines the hub cap assembly air passage 122. The hub cap assembly air passage 122 is in fluid communication with fluid passage 36 in the air spindle via an air chamber 142. The air chamber 142 is provided in the inner housing 52. The air chamber 142 enables fluid communication between the fluid passage 36 and the hub cap assembly air passage 122.

The inner housing 52 and the air spindle 34 are radially separated from each other by the air chamber 142, the rotary oil seal 60, the rotary air seal 62, and the vent chamber 70. Also, as noted above, the hub cap assembly 10 and the air spindle 34 are in fluid communication via the air chamber 142. More particularly, the inner housing 52 is in fluid communication with the air spindle 34 via the air chamber 142 and vice versa. When it is desired to increase tire pressure, pressurized air is transferred from the air spindle 34 to the hub cap assembly 10 via the air chamber 142. Similarly, when it is desired to decrease tire pressure, pressurized air is transferred from the hub cap assembly 10 to the air spindle 34 via the air chamber 142.

The air chamber 142 is defined by an outboard wall portion 144 of the inner housing 52, the inner surface 146 of the inner housing 52, and the rotary air seal 62. In an embodiment, the inner surface 146 of the inner housing 52 defines the inner surface 64 of the hub cap assembly 10. The inner surface 146 of the inner housing 52 comprises a first portion 148, a second portion 150, a third portion 152, and a fourth portion 154. The portions 148-154 are axially spaced apart from each other and oriented in a parallel relationship with each other. In an embodiment, the fourth portion 154 is of a cylindrical shape and has a diameter which is larger than a diameter of the third portion 152. Preferably, the third portion 152 is of a cylindrical shape. The third portion 152 has a diameter which is larger than a diameter of the first portion 148. Preferably, the first portion 148 is of a cylindrical shape. Also, it is preferred that the first portion 148 has a diameter which is larger than a diameter of the second portion 150. In this embodiment, the second portion 150 is of a cylindrical shape.

Preferably, the rotary air seal 62 is attached to and provides a seal against the first portion 148. The first portion 148 abuts the annular groove 68 that is utilized to secure the snap ring 66 to the hub cap assembly 10. The first portion 148 is separated from the third portion 152 by the annular groove 68. The first portion 148 is attached to a first radially extending portion 156. The first radially extending portion 156 connects the first portion 148 to the second portion 150. A portion of the rotary air seal 62 abuts the first radially extending portion 156.

Preferably, the rotary oil seal 60 is attached to and provides a seal against the fourth portion 154. The fourth portion 154 may also comprise an annular groove for securing the locating washer (if provided) to the hub cap assembly 10. The fourth portion 154 is attached to a second radially extending portion 158. The second radially extending portion 158 connects the fourth portion 154 and the third portion 152. A portion of the rotary oil seal 60 abuts the second radially extending surface 158. The portions 148-158 at least partially define a cavity 160 provided in the inner housing 52.

As noted above, the air chamber 142 is in fluid connection with the hub cap assembly air passage 122. In an embodiment, the hub cap assembly air passage 122 is oriented in a perpendicular relationship with the air chamber 142 and the longitudinal axis of the air spindle 34. The air chamber 142 and the vent chamber 70 are separated by the rotary air seal 62. The vent chamber 70 and the inboard space 140 provided within the outer housing 54 are separated by the rotary oil seal 60.

The vent chamber 70 is at least partially defined by the rotary oil seal 60, the rotary air seal 62, and the third portion 152 of the inner surface 146 of the inner housing 52. Preferably, the vent chamber 70 is of a generally annular shape. The vent chamber 70 is provided axially between the rotary oil seal 60 and the rotary air seal 62. The vent chamber 70 is positioned radially between the inner surface 64 of the hub cap assembly 10 and the outboard portion 50 of the air spindle 34. More particularly, the vent chamber 70 is positioned radially between the inner surface 146 of the inner housing 52 and the second outer diameter portion 112 of the air spindle 34. Even more particularly, the vent chamber 70 is positioned radially between the third portion 152 of the inner housing inner surface 146 and the second outer diameter portion 112 of the air spindle 34.

The vent chamber 70 is in fluid communication with the atmosphere via a vent passage 162. If the rotary air seal 62 fails and pressurized air passes from the air chamber 142 to the vent chamber 70, the pressurized air is directed by the vent passage 162 to the atmosphere. On an end, the vent passage 162 intersects and is in fluid communication with the vent chamber 70. On an opposite end, the vent passage 162 is in fluid communication with the atmosphere. In an embodiment, the vent passage 162 increases in diameter from the vent chamber 70 toward the atmosphere.

The vent passage 162 is oriented in a perpendicular relationship with the vent chamber 70 and the longitudinal axis of the air spindle 34. Also, in certain embodiments, the vent passage 162 is oriented in a parallel relationship with the hub cap assembly air passage 122. However, in other embodiments, the vent passage 162 may be provided at another angle with respect to or in another relationship with the hub cap assembly air passage 122.

The vent passage 162 extends from the inner housing 52, through the second arm 136, and to the outer surface 132 of the outer wall portion 96 where it communicates with the atmosphere via a vent member 130. The vent member 130 acts as a filter by allowing pressurized air, oil or another lubricant to pass to the atmosphere but prevents dirt and debris from entering the assembly 12 via the vent passage. The vent member 130 may be coupled to the outer wall portion 96 via a threaded connection. In an embodiment (not depicted), the vent member and the outer wall portion may be formed in a unitary manner. The vent member 130 extends beyond an outer surface 132 of the outer wall portion 96. Advantageously, the hub cap assembly 10 allows pressurized air that escapes past the rotary air seal 62 to be directed to the atmosphere and oil or another lubricant that escapes past the rotary oil seal 60 to be directed to the atmosphere via the vent passage 162 and vent member 130.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A wheel end assembly for a tire inflation system, comprising:
   a spindle having a passage formed therein;
   a hub cap assembly having an inner housing and an outer housing, wherein the inner housing has an end surface which is spaced apart axially from an end portion of the outer housing, the inner housing and outer housing being in fluid communication via through an air passage;
   an air spindle having an inboard portion disposed in the spindle and an outboard portion disposed in the inner housing, the air spindle having a fluid passage in fluid communication with the passage formed in the spindle and the air passage formed in the hub cap assembly;
   a rotary air seal disposed around the air spindle; and
   a rotary oil seal disposed around the air spindle and spaced apart from the rotary air seal.

2. The wheel end assembly of claim 1, further comprising a vent chamber provided between the rotary air seal and the rotary oil seal, the vent chamber in fluid communication with the atmosphere through a vent passage.

3. The wheel end assembly of claim 1, wherein the rotary air seal and the rotary oil seal are each disposed in the inner housing and around the outboard portion of the air spindle.

4. The wheel end assembly of claim 1, wherein a vent chamber is at least partially defined by the rotary air seal, the rotary oil seal and a portion of an inner surface of the inner housing.

5. The wheel end assembly of claim 1, wherein the air passage is provided through a first arm, the first arm being formed in a unitary manner with the outer housing and the inner housing.

6. The wheel end assembly of claim 1, further comprising a first arm which extends in a radial direction between the outer housing and the inner housing, wherein the first arm is circumferentially spaced apart from a second arm.

7. The wheel end assembly of claim 1, wherein the outer housing comprises a sight glass, which at least partially defines an end surface of the outer housing.

8. The wheel end assembly of claim 1, wherein the rotary air seal and the rotary oil seal are attached to an inner surface of the hub cap assembly and are in sealing contact with the outboard portion of the air spindle.

9. The wheel end assembly of claim 1, wherein the hub cap assembly is attached to a hub and comprises a flange in sealing contact with an outboard surface of the hub.

10. The wheel end assembly of claim 2, wherein the vent passage is provided through a second arm, the second arm being formed in a unitary manner with the outer housing and the inner housing.

11. The wheel end assembly of claim 2, wherein the vent chamber is of a generally annular shape.

12. The wheel end assembly of claim 6, wherein spaces provided between the first arm and the second arm are utilized to allow fluid communication between an inboard space and an outboard space provided within the outer housing.

13. The wheel end assembly of claim 7, further comprising a pressure relief valve disposed in a center portion of the sight glass, the pressure relief valve allowing pressurized air in a space between an end surface of the inner housing and an end portion of the outer housing to be discharged to atmosphere.

14. The wheel end assembly of claim 8, wherein the rotary air seal and the rotary oil seal are attached to separate portions of the inner surface and the portions are axially spaced apart from each other.

15. A wheel end assembly for a tire inflation system, comprising:
- a spindle having a passage formed therein;
- a hub cap assembly having an inner housing and an outer housing, the inner housing and outer housing being in fluid communication via through an air passage;
- an air spindle having an inboard portion disposed in the spindle and an outboard portion disposed in the inner housing, the air spindle having a fluid passage in fluid communication with the passage formed in the spindle and the air passage formed in the hub cap assembly;
- a rotary air seal disposed around the air spindle;
- a rotary oil seal disposed around the air spindle and axially spaced apart from the rotary air seal; and
- a vent chamber provided between the rotary air seal and the rotary oil seal, the vent chamber in fluid communication with the atmosphere via through a vent passage.

16. The wheel end assembly of claim 15, further comprising a first arm which extends in a radial direction between the outer housing and the inner housing, wherein the first arm is circumferentially spaced apart from a second arm, the second arm at least partially defining the vent passage and extending in a radial direction between the outer housing and the inner housing.

17. The wheel end assembly of claim 15, wherein the rotary air seal and the rotary oil seal are attached to separate surfaces of the inner housing and are in sealing contact with the outboard portion of the air spindle, wherein the vent chamber is generally of an annular shape and is at least partially defined by the rotary air seal, the rotary oil seal and a portion of the inner housing.

18. The wheel end assembly of claim 16, wherein the first arm and the second arm are each formed in a unitary manner with the outer housing and the inner housing.

19. The wheel end assembly of claim 16, wherein spaces provided between the first arm and the second arm are utilized to allow fluid communication between an inboard space and an outboard space provided within the outer housing, the outboard space being provided between an end surface of the inner housing and an end portion of the outer housing.

* * * * *

UNITED STATES PATENT AND TRADEMARK OFFICE
CERTIFICATE OF CORRECTION

PATENT NO. : 10,556,469 B2
APPLICATION NO. : 15/264427
DATED : February 11, 2020
INVENTOR(S) : William J. Foor, Christopher P. Lewark and Douglas C. Burke It is certified that error appears in the above-identified patent and that said Letters Patent is hereby corrected as shown below:

In the Claims
Claim 1, Column 10, Line 15, delete the word "via"
Claim 15, Column 11, Line 13, delete the word "via"
Claim 15, Column 11, Line 24, delete the word "via"

Signed and Sealed this
Thirty-first Day of March, 2020

Andrei Iancu
*Director of the United States Patent and Trademark Office*